(12) United States Patent
Buda

(10) Patent No.: US 8,973,846 B2
(45) Date of Patent: Mar. 10, 2015

(54) RAIL FASTENING SYSTEM

(75) Inventor: Roland Buda, Radolfzell am Bodensee (DE)

(73) Assignee: Schwihag AG, Taegerwilen (CH)

( * ) Notice: Subject to any disclaimer, the term of this patent is extended or adjusted under 35 U.S.C. 154(b) by 0 days.

(21) Appl. No.: 13/696,076

(22) PCT Filed: Jul. 12, 2011

(86) PCT No.: PCT/EP2011/003472
§ 371 (c)(1),
(2), (4) Date: Jan. 11, 2013

(87) PCT Pub. No.: WO2012/010269
PCT Pub. Date: Jan. 26, 2012

(65) Prior Publication Data
US 2013/0105590 A1    May 2, 2013

(30) Foreign Application Priority Data

Jul. 19, 2010   (DE) .......................... 10 2010 027 560

(51) Int. Cl.
*E01B 9/30* (2006.01)
*F16B 33/00* (2006.01)
*E01B 9/48* (2006.01)

(52) U.S. Cl.
CPC ................. *E01B 9/30* (2013.01); *F16B 33/004* (2013.01); *E01B 9/303* (2013.01); *E01B 9/483* (2013.01)
USPC .......................................... 238/351; 411/369

(58) Field of Classification Search
CPC ........... E01B 9/30; E01B 9/303; E01B 9/306; E01B 9/48; E01B 9/62; E01B 9/68; E01B 9/685; E01B 2205/00; E01B 9/10; E01B 9/18; E01B 9/16; F16B 43/001; F16B 33/004; Y10S 11/915
USPC ............... 238/349, 351; 411/542, 369, 371.1; 277/640, 650
See application file for complete search history.

(56) References Cited

U.S. PATENT DOCUMENTS 4,770,343 A    9/1988   Heim

FOREIGN PATENT DOCUMENTS

| DE | 40 34 032 | * | 4/1992 |
| DE | 3440110 B | | 12/1992 |
| EP | 0393432 B | | 10/1990 |
| EP | 0808946 A | | 11/1997 |
| FR | 2327887 A | | 5/1997 |

* cited by examiner

*Primary Examiner* — Mark Le
(74) *Attorney, Agent, or Firm* — Andrew Wilford

(57) ABSTRACT

A system for fastening a rail to a substrate has an anchor in the substrate, a fastener having a shank secured in the anchor and a head above the substrate, an angle guide plate vertically traversed by the shank, an annular part between the head of the fastener and the guide plate, and a spring clip engaged between the head and the part and shiftable transversely of the rail and of the shank between a preinstallation position horizontally offset from and not engaging the rail and a final installation position bearing vertically downward on the rail. A seal ring engages in both the preinstallation position and the final installation position around the shank and compressed between the part, the angle plate, and the shank so as to prevent water from traveling down the shank into the anchor.

12 Claims, 5 Drawing Sheets

RAIL FASTENING SYSTEM

CROSS REFERENCE TO RELATED APPLICATIONS

This application is the U.S. national stage of PCT application PCT/EP2011/003472 filed 12 Jul. 2011 and claiming the priority of German patent application 102010027560.3 itself filed 19 Jul. 2010.

FIELD OF THE INVENTION

The invention relates to a rail-fastening system for frictionally locking a rail to a sleeper of a train track, comprising at least one angle guide plate that can be secured to the railroad sleeper by at least one fastener having a shank, and at least one clip, the angle guide plate being designed to retain the clip in a preinstallation position and in a final installation position.

BACKGROUND OF THE INVENTION

A rail-fastening system of analogous type is revealed DE 34 00 110 [U.S. Pat. No. 4,770,343] in which the railroad rail is secured by the screw, anchor, angle guide plate, and clip. A clip is used here that is provided between an angle guide plate (retention plate) and a screw (fastening anchor) when in the installed state. The clip here has two arms that are configured as torsion elements. The torsion arms have two parallel adjacent flexible rod sections that are connected together as a single piece by a loop that forms a clamping section and is essentially bent outward perpendicular to them.

A rail-fastening system of this type must solve two problems:

First, it is desirable to be able to fix different rail types (for example, type U 50 and type UIC 60) having different rail foot widths to different types of concrete sleepers using only one type of clip. The adaptation can be effected here by different angle guide plates.

Secondly, it is advantageous in terms of a simple, cost-effective and reliable installation of the rail-fastening system if the installation can be performed by sliding the clip from a preinstallation position (with the screw tightened with a torque of approximately 50 Nm) to a final installation position. It is important here to be able to easily slide the clip without having previously loosened the screw (pretightened with the above-mentioned torque). It is furthermore important that no lifting of the railroad sleeper be required here, an action that would make installation significantly more difficult. This is the only way installation can be automated.

Another aspect that is also of key importance to this invention is that the rail-fastening system be of high electrical resistance. This resistance is measured between the two rails on a concrete sleeper in the wet state, that is the value of the resistance is measured when exposed to a continuous rain. The rail is typically insulated from the railroad sleeper by the plastic anchor for the screw, the rail pad that is composed of rubber or plastic, and the plastic angle guide plate. This type of insulation is completely sufficient when dry. When wet (that is when exposed to rain), this insulation is not sufficient since water flows into the gaps and cracks in the rail-fastening system. The region of the anchor is especially affected as water flowing into the anchor results in a short-circuiting of its electrical resistance. The prior art remedies this by filling grease (for example Elaskon) into the anchor before insertion of the screw. The insulating effect is provided only to a limited extent since this action is performed during irregular construction operations and also since the grease hardens after a certain period of time. The previously known rail-fastening systems thus still have vulnerabilities in terms of this range of problems to be solved.

OBJECT OF THE INVENTION

The object of this invention is therefore to further develop a rail-fastening system of the type described above so as to enable the above-described requirements to be met in an optimal manner. Accordingly, a simple and automated installation of the system should be possible that can be easily adapted to different rail types, the primary goal being to ensure that the system is characterized by high electrical resistance.

SUMMARY OF THE INVENTION

The object is achieved according to the invention in that a seal is provided on or in the angle guide plate and/or in a part to be attached to the angle guide plate, which seal both in the preinstalled position and in the final installation position contacts with a sealing effect the shank of the fastener with at least one first sealing surface and contacts the angle guide plate and/or the part to be attached to the angle guide plate with at least one second sealing surface, such that these contacts create a seal.

The fastener here is preferably a screw that is inserted into an anchor provided in the railroad sleeper. A hook screw/nut combination can also be used as an alternative to this screw-anchor combination.

The seal is preferably provided in the form of a sealing ring that is preferably composed of two ring sections that are disposed in a radial section at an angle to each other. The two ring sections can each be provided in conical form at an outer and/or inner peripheral surface, such that the radial thicknesses of the ring sections decrease toward the axial ends of the sealing ring.

The seal can be provided in the form of an intermediate sleeve in a part to be attached to the angle guide plate, the intermediate sleeve including a tubular part with an inner cylindrical surface that defines a seat for the seal. The intermediate sleeve can furthermore include a section that projects radially inward and creates an axial contact surface for the seal.

The part to be attached, the seal, and the shank are preferably arranged concentric to one another.

The seal is typically composed of elastomer or rubber material, and has elastic properties.

Another seal is preferably provided between a lower end face of the angle guide plate and an upper face of the railroad sleeper. This element can be flat, or can be provided in a groove on the lower end face of the angle guide plate.

The angle guide plate can include a preferably wedge-shaped support for the rail support section of the clip, on which support the rail support section rests in the preinstallation position. The end facing the rail of the preferably wedge-shaped support here can advantageously project above the rail foot by a predetermined vertical amount, preferably by between 5 mm and 15 mm. This significantly simplifies installation in the event of irregularities.

The proposed embodiment of the rail-fastening system enables a result to be achieved where the clip is preinstalled with the screw that is tightened with a predetermined preinstallation torque. The clip is moved into the final installation position by simply sliding the clip horizontally and perpendicular to the longitudinal axis of the rail, which action is easily possible even when the rail support sections of the clip and the rail foot are misaligned.

The center loop of the clip is relatively long, and as a result the clip arms are also very long. A shape is chosen for the two clip arms that achieves a reinforcing effect so as to enable the requisite clamping force to be applied without modifying the wire cross-section. The angle between the front part (rail support section) of the clip arm and the rear part (clamping section) of the clip arm is essentially a right angle, with the result that each arm is subjected only to bending stress, but not to torsion. This enables greater forces to be transferred.

The front part of the central loop of the clip is bent sharply downward so as to provide tip-over protection (the center loop is the tip-over protection) when in the installed state (that is in the final installation position). The distance from the rail foot here does not exceed approximately 2.0 mm in all rail variants and railroad sleeper variants.

The center loop, and especially the two sections in the center region of the clip that run parallel to each other, have flattened surfaces, the planes of which are tilted relative to each other by a small angle, which aspect results due to the length of the mutually parallel sections of the center loop and of the sharply downward-bent front part (loop section). These surfaces can be made, for example, by grinding.

The additionally flattened surface for preinstallation on the center loop has the effect that the washer under the screw head rests flatly on the clip in the preinstallation state, and thus no jamming occurs when the clip is moved from the preinstallation position to the final installation position.

On the support point for the clip arms (that is of the rail support sections), the angle guide plate for the preinstallation position is preferably wedge-shaped and raised by at least 10 mm relative to the final position of the clip arms on the rail foot when in the final installation position. The reason for this is as follows: When track is constructed, the railroad sleepers are laid out in succession with preinstalled fastening means and with a spacing of approximately 0.65 m on an initially leveled ballast bed. The rail is then laid on the sleepers, specifically in the rail channel that is formed by the preinstalled rail-fastening means. The rail foot here does not always rest completely on the respective sleepers since the sleepers can easily lie at different levels due to irregularities in the ballast bed support surface. As a result, a wide gap of up to 10 mm can then be created between the bottom face of the rail and the sleeper support; or the rail foot extends vertically too high up by a maximum of 10 mm. As a result, the clip cannot be moved from the preinstallation position into the final installation position since the clip hits the rail foot. The proposed angle guide plate with raised wedge-shaped support enables this effect to be eliminated.

In addition, the applied force when sliding the clip from the preinstallation position to the final installation position can be reduced due to the fact that the center loop of the clip is supported elastically in the preinstallation position—specifically, through the referenced intermediate sleeve in which the highly-elastic seal is integrated. This intermediate piece with seal ring in thus performs a double function—specifically, elastically supporting the clip in the preinstallation position, and providing a water seal both in the preinstallation and in the final installation position.

The above-described embodiment provides a considerable improvement in terms of electrical insulation; an improved water seal is thus provided by the invention. Accordingly, the anchor and the region around the anchor are completely sealed against water. High electrical resistance is thus advantageously maintained even when exposed to rain.

The seal is effected first of all by the intermediate piece (intermediate sleeve) and the sealing ring in the region of the center loop. Due to its geometry, the sealing ring also advantageously already functions as a seal in the preinstallation position. When tightened down—that is, when the final installation position has been reached—the center loop of the clip presses on the intermediate piece and elastically deforms the sealing ring. In addition, another seal is integrated into a lower end face of the angle guide plate. The inside diameter of the seal, which is implemented by way of example as a sealing ring, is larger here than the outside diameter of the anchor crown.

BRIEF DESCRIPTION OF THE DRAWING

Embodiments of the invention are shown in the drawing. Here.

SPECIFIC DESCRIPTION OF THE INVENTION

Figure 1:
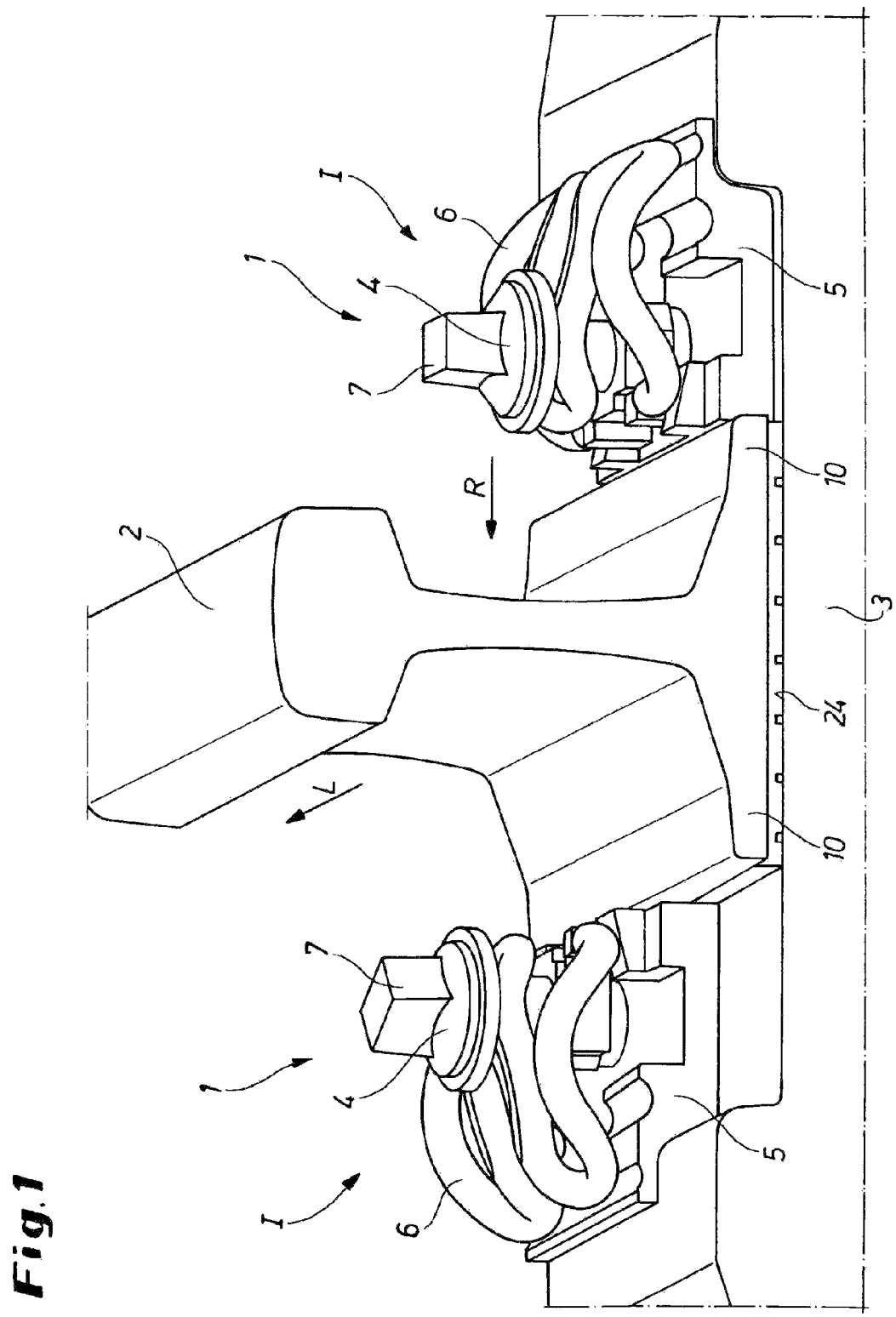
FIG. 1 is a perspective view of one part of a train track comprising a rail, sleeper, and a rail-fastening system, the clips of the system being located in a preinstallation position.

FIG. 1 shows the basic design of friction-locked elastic rail-fastening systems 1 for a train track. The rail 2 must be fastened to a railroad sleeper 3 (or to a rail bearing plate). To this end, a recess 24 is formed in the sleeper 3.

Angle guide plates 5 are provided on both sides of the rail 2 to retain the rail 2 and a rail foot 10 and fastened to the sleeper 3 by respective fasteners 4, here screws. Clips 6 held down by the screws 4 frictionally and elastically secure the rail foot 10. FIG. 1 shows a preinstallation position I in which the screws 4 are tightened with a tightening torque of approximately 50 Nm, that is not yet completely tightened down.

Figure 2:
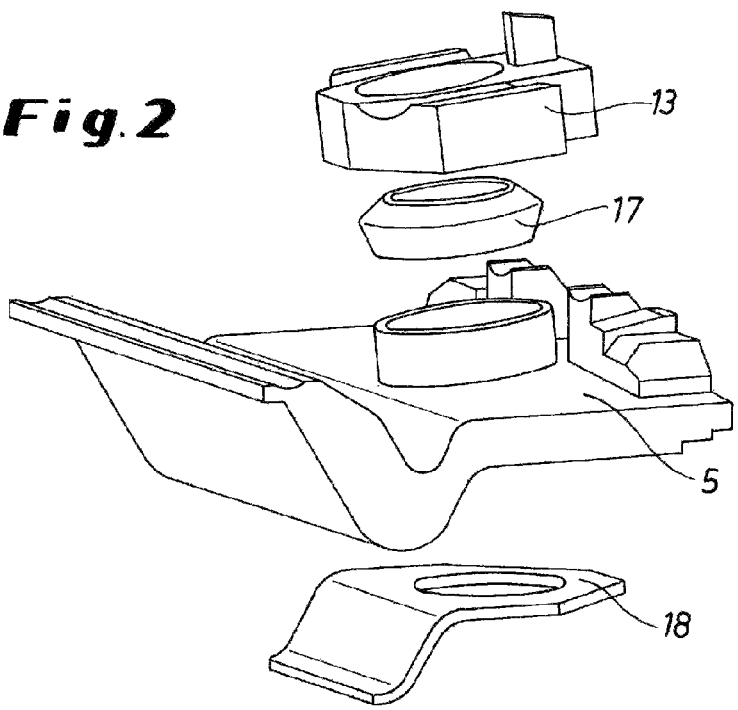
FIG. 2 is an exploded view of the angle guide plate of a rail-fastening system that is somewhat different, and shows, in particular, a sealing system.
Figure 3:
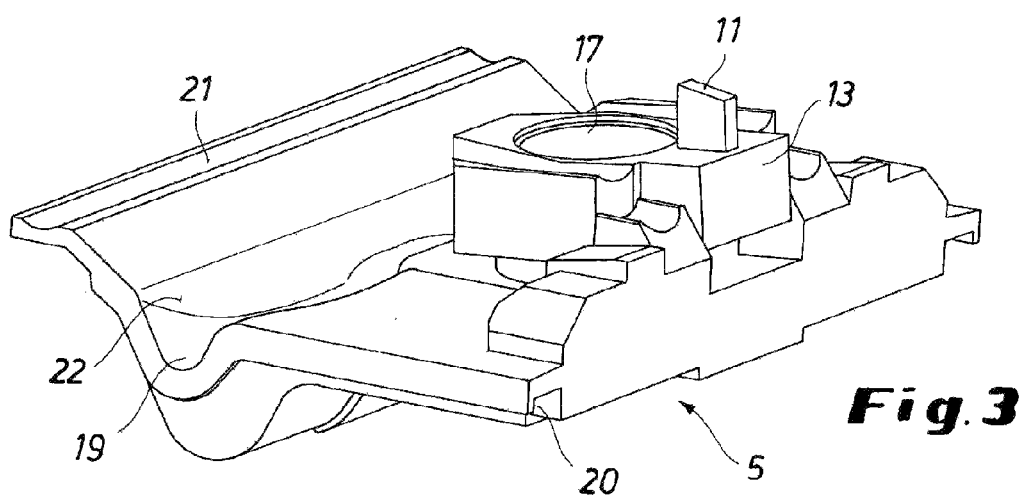
FIG. 3 is a perspective view of the angle guide plate of the rail-fastening system in FIG. 2 together with an intermediate sleeve including a seal.
Figure 4:
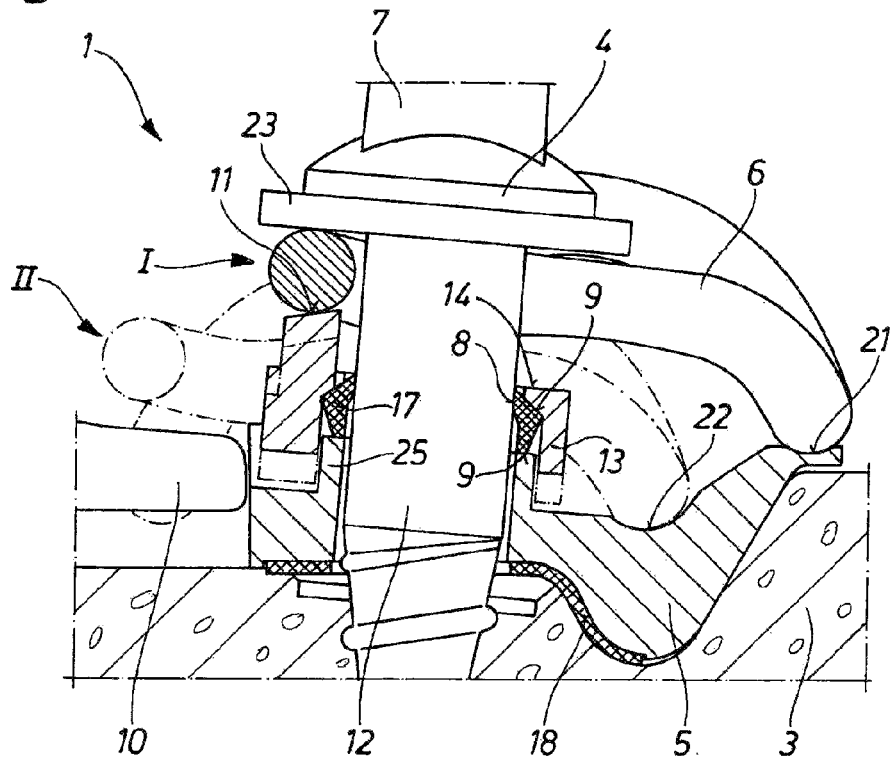
FIG. 4 is a sectional side view of the rail-fastening system of FIG. 2 in the preinstallation position.
Figure 5:
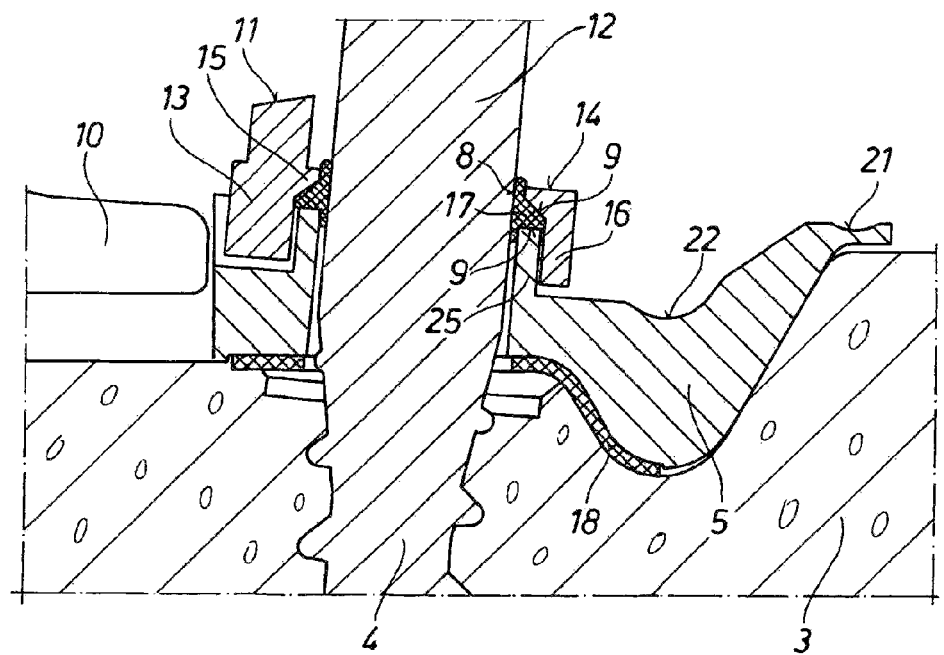
FIG. 5 is a sectional side view of the rail-fastening system of FIG. 2 in the final installation position.

FIGS. 2, 3, 4, and 5 show an embodiment of the invention, where FIG. 2 is an exploded view of the angle guide plate 5 together with an intermediate sleeve 13 and two seals 17 and 18, while FIG. 3 shows these parts assembled. FIGS. 4 and 5 are sectional views of the rail-fastening system, with FIG. 4 showing a preinstallation position (clip indicated by solid lines). This figure also shows the final installation position for the clip, this being indicated in the final installation position by dot-dash lines. FIG. 5 shows the final installation position, although the clip is not shown here.

When the system 1 is installed, the clip 6 is slid from the preinstallation position I of FIG. 1 in an essentially horizontal direction R (see FIG. 1) perpendicular to the longitudinal axis L of the rail 2. As a result, the clip 6 moves from the position indicated by solid lines in FIG. 4 to the final installation position II that is marked by dot-dash lines in FIG. 4. The recesses 21 (for the preinstallation position) and 22 (for the final installation position) are provided for both positions I and II in the angle guide plate 5 in order to retain the clip 6 here in a predefined location.

The following should be noted with reference to FIGS. 2 through 5:

The guide plate 5 includes a guide section 25 (see FIG. 4 and FIG. 5) that is cylindrically tubular. This guide section 25 is designed to accommodate the intermediate sleeve 13 or a sealing head. The guide plate 5 furthermore has a drain channel 19 and a drip edge 20.

The intermediate sleeve 13 includes a raised support 11 that functions to elevate the clip 6 on its end facing the rail foot 10 in the preinstallation position I. This enables a height misalignment of the rail 2 to be compensated for during installation. Otherwise, the intermediate sleeve 13 is essentially cylindrically tubular, that is it has a tubular part 16 and a radially inwardly projecting ridge 15 at its axial upper end 14. An upper end face 14 of the intermediate sleeve 13 is designed to have a clamping force applied to it from above. When in the final installation position II of system 1, the force is transmitted from a head 7 of the screw through a washer 23 and a section of the clip 6.

As a result, the intermediate sleeve 13 slides vertically in telescoping fashion along a guide section 25 of the plate 5.

Figure 6A:
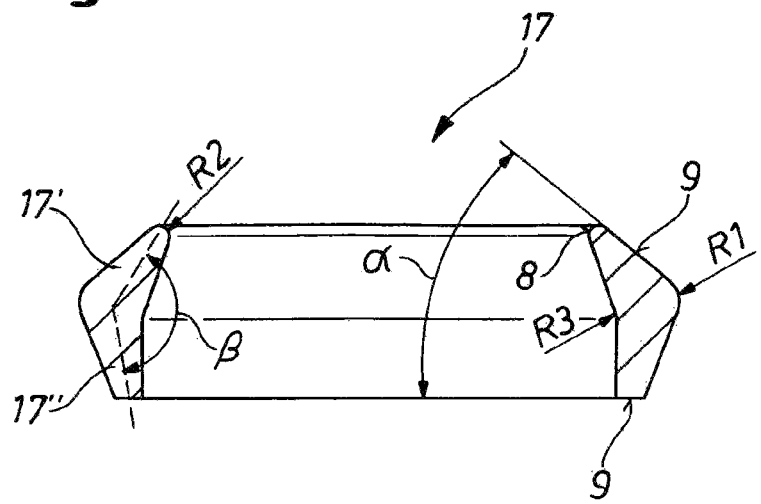
FIG. 6a is a diametral section.
Figure 6B:
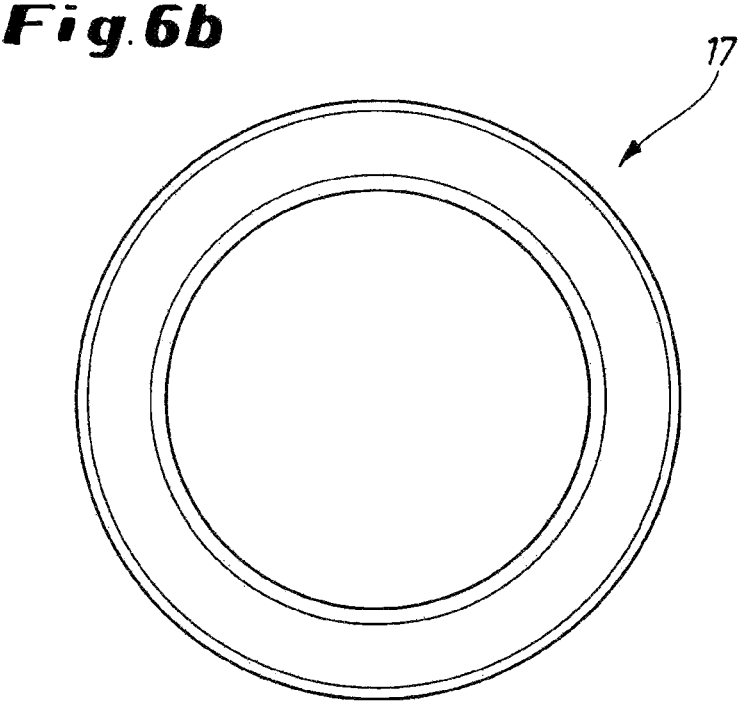
FIG. 6b shows a top view of the seal in the form of a to ring.

The radial inside surface of the tubular part 6 forms a seat in which the seal 17 is held. The seal 17 is shown in radial section when not deformed in FIG. 6a, while a top view of this element is provided in FIG. 6b. Accordingly, the seal 17 is rotation symmetrical and has two annular sections 17 and 17' that are joined together as one piece. The two ring sections 17 and 17' are centered on axes shown on the left and indicating that the two sections are oriented at an angle β relative to each other. In this case this angle is approximately 140°.

Each ring sections 17 and 17' has frustoconical outer and inner surfaces. It is evident that top ring section 17' has an outer circumferential surface that forms an angle α to a plane perpendicular to the rotational axis of the body, the angle here being approximately 40°.

Otherwise, the individual transitions between the sections are rounded with radii R1, R2, and R3.

The seal 17 has at least one first sealing surface 8 and at least one second sealing surface 9—in this case in fact two sealing surfaces 9.

It is evident in FIG. 4 that already in the preinstallation position the seal 17 engages a shank 12 of the screw 4 with the first sealing surface 8, and presses both of the second sealing surfaces 9 against the guide plate 5, or more precisely, the top end of guide section 25 and the inside of the intermediate sleeve 13. As a result, a seal is created already in the preinstallation position for the shank 12 relative to the lower region of the screw 4 or of the guide plate 5.

When the clip 6 in FIG. 4 is slid left into the final installation position II (see dot-dashed location of the clip 6), a state is created that is shown in FIG. 5. As a result, the screw 4 together with its screw head 7 and washer 23 now press against loop of the clip 6, and it in turn presses against the upper end face 14 of the intermediate sleeve 13, with the result that the intermediate sleeve 13 is pressed downward against the guide section 25. The seal 17 in the intermediate sleeve 13 is deformed in the manner shown, with the result that sealing surfaces 8 and 9 are pressed firmly against the respective contact regions. An absolute sealed state is thus ensured.

FIGS. 2 through 5 furthermore show that a lower face of the guide plate 5 is sealed by the other seal 18 toward the sleeper 3. The seal 18 here is a sheet.

Figure 7:
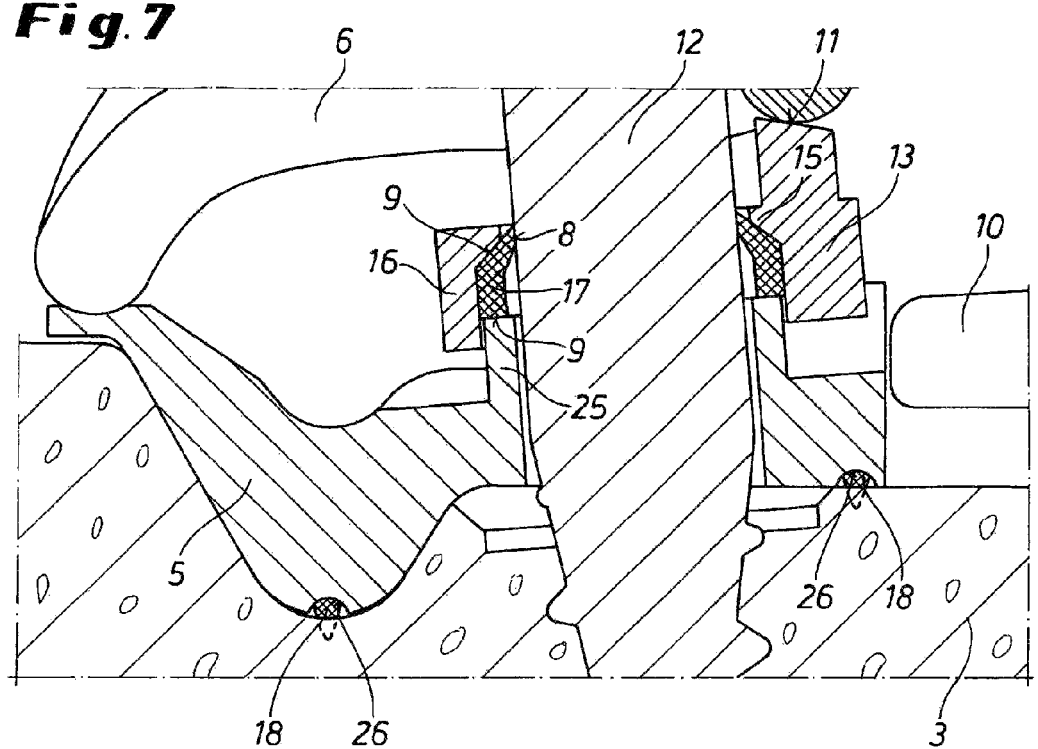
FIG. 7 is a sectional side view of the rail-fastening system in the preinstallation position for an alternative embodiment of the invention with respect to the sealing system used.
Figure 8:
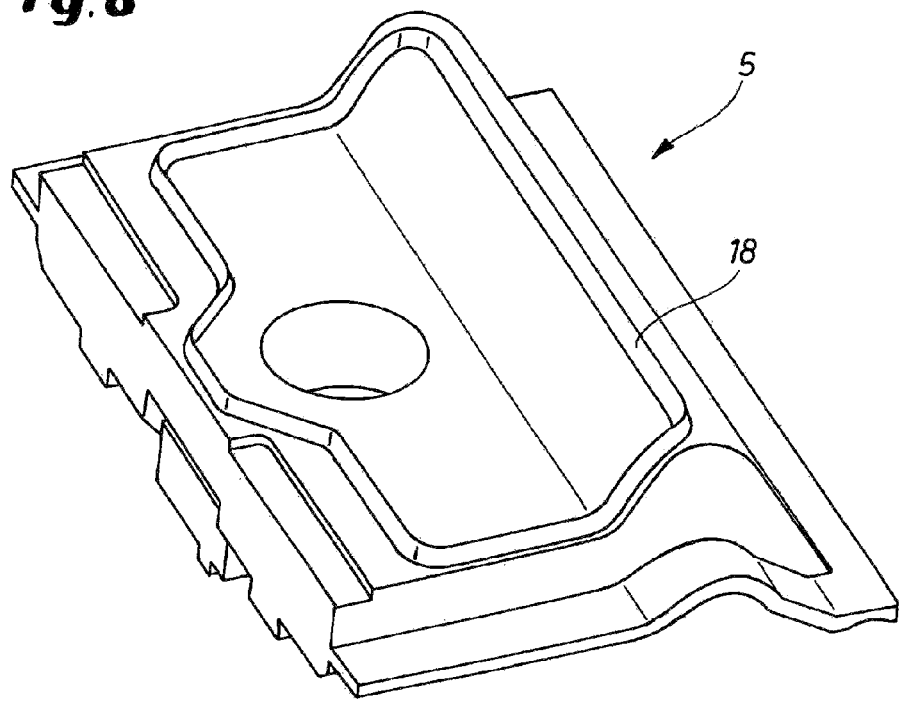
FIG. 8 is a perspective view of the angle guide plate of the system of FIG. 7 seen from below, including the provided seal.

FIGS. 7 and 8 show an alternative solution to this, the modification here relating primarily to the seal 18. The guide plate 5 has a closed annular indentation 26 on its bottom face in which a similarly closed annular seal 18 is fitted.

One possible approach is to secure the seal 18 in place by an adhesive.

Another possible approach would be use an injection-molding process to injection-mold the seal 18 onto the guide plate 5.

Either way, the seal 18 reliably seals the guide plate 5 at its bottom face due the closed annular shape both after and also before final installation. As FIG. 7 indicates, the seal 18 projects somewhat from the groove 26 before installation; when the guide plate 5 is seated on the installation surface, the projecting region is compressed so as to ensure a reliable sealing function.

This thus ensures that the described sealing concept provides a reliable sealing effect both in the preinstallation position and also in the final installation position.

As a result, the invention thus provides a universal sealing concept along with the simplified preinstallation solution for all rail-fastening systems that are equipped with clips and angle guide plates, and that are secured in place on the (concrete) railroad sleepers by a screw-anchor combination, or also by another fastener.

The invention claimed is:

1. A rail-fastening system for frictionally locking a rail to a railroad sleeper of a train track, the system comprising:
   an angle guide plate;
   a fastener having a shank;
   a clip, the fastener being engageable through the clip and the angle guide plate with the sleeper, the angle guide plate being designed to retain the clip in a preinstallation position disengaged from the rail and in a final installation position engaged with and pressing the rail down against the sleeper;
   an intermediate sleeve fitted to the angle guide plate and including a tubular part with an inner cylindrical surface that defines a seat;
   a seal provided on or in the angle guide plate or in the seat, the seal both in the preinstallation position and in the final installation position contacting a shank of the fastener with at least one first sealing is surface and contacting the angle guide plate or the seat with at least one second sealing surface to create a seal between the seal and the shank and between the seal and the angle guide plate.

2. The rail-fastening system according to claim 1, wherein the fastener is a screw that is inserted into an anchor provided in the railroad sleeper.

3. The rail-fastening system according to claim 1, wherein the seal is a seal ring that is composed of two ring sections that extend at an angle to each other.

4. The rail-fastening system according to claim 1, wherein the intermediate sleeve has a radially inwardly projecting ridge that creates an axial contact area for the seal.

5. The rail-fastening system according to claim 1, wherein the intermediate sleeve, the seal, and the shank are concentric.

6. The rail-fastening system according to claim 1, wherein the seal is composed of elastomer or rubber material, and has elastic properties.

7. The rail-fastening system according to claim 1, wherein another seal is provided between a lower end face of the angle guide plate and an upper face of the railroad sleeper.

8. The rail-fastening system according to claim 7, wherein the other seal is flat or is provided in a groove on a lower end face of the angle guide plate.

9. A rail-fastening system for frictionally locking a rail to a railroad sleeper of a train track, the system comprising:
- an angle guide plate;
- a fastener having a shank;
- a clip, the fastener being engageable through the clip and the angle guide plate with the sleeper, the angle guide plate being designed to retain the clip in a preinstallation position to disengaged from the rail and in a final installation position engaged with and pressing the rail down against the sleeper;
- a seal ring comprised of two ring sections that extend at an angle to each other and provided on or in the angle guide plate or in a part attached to the angle guide plate, the seal both in the preinstallation position and in the final installation position contacting a shank of the fastener with at least one first sealing surface and contacting the angle guide plate or the part to be attached to the angle guide plate with at least one second sealing surface to create a seal between the seal and the shank and between the seal and the angle guide plate, the two ring sections having outer or inner frustoconical peripheral surfaces, the radial thickness of the ring sections decreasing toward respective axial ends of the sealing ring.

10. The rail-fastening system according claim 9, wherein the part is an intermediate sleeve fitted to the angle guide plate and including a tubular part with an inner cylindrical surface that defines a seat for the seal.

11. A system for fastening a rail to a substrate, the system comprising:
- an anchor in the substrate;
- a fastener having a shank secured in the anchor and a head above the substrate;
- an angle guide plate vertically traversed by the shank;
- an intermediate sleeve between the head of the fastener and the guide plate and having a tubular part with an inner cylindrical surface that defines a seat;
- a spring clip engaged between the head and the part and shiftable transversely of the rail and of the shank between a preinstallation position horizontally offset from and not engaging the rail and a final installation position bearing vertically downward on the rail; and
- a seal ring engaged in both the preinstallation position and the final installation position around the shank and compressed between the seat, the angle plate, and the shank so as to prevent water from traveling down the shank into the anchor.

12. The fastening system defined in claim 11, further comprising:
- another seal vertically traversed by the shank and compressed vertically between a lower face of the angle plate and an upper face of the substrate, whereby the other seal prevents travel of water along the substrate into the anchor.

* * * * *